Nov. 8, 1938.  C. H. KRAUSE  2,135,670
VALVE
Filed March 28, 1936
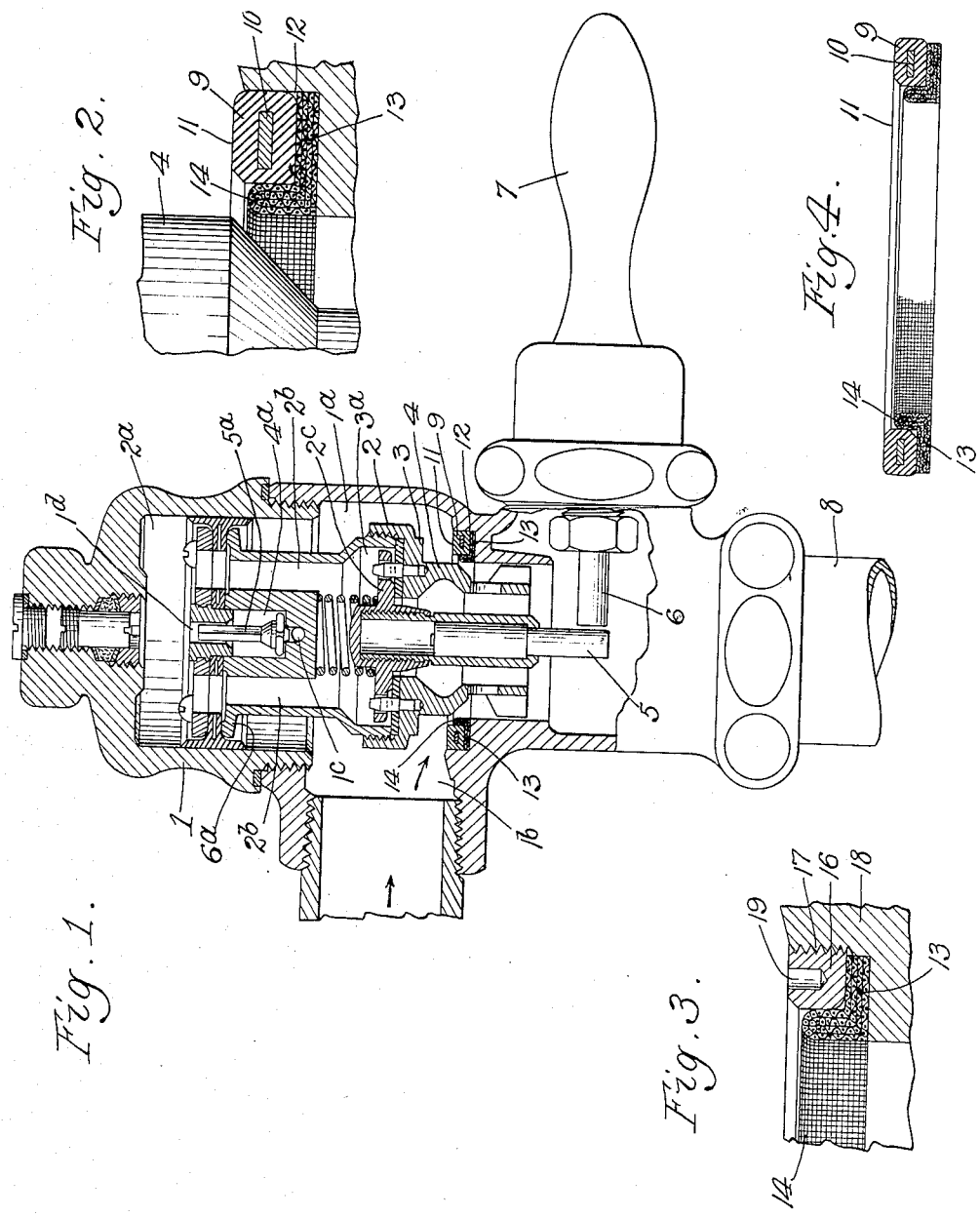
Inventor
Carl H. Krause
by Parker & Carter
Attorneys.

Patented Nov. 8, 1938

2,135,670

UNITED STATES PATENT OFFICE 2,135,670

VALVE

Carl H. Krause, Chicago, Ill., assignor to Sloan Valve Company, Chicago, Ill., a corporation of Illinois Application March 28, 1936, Serial No. 71,421

12 Claims. (Cl. 137—93)

This invention relates to improvements in valves and has for its object to provide a new and improved device of this description.

The invention has as a further object to provide a valve having a new and improved valve seat which very materially decreases the noise when the liquid is flowing through the valve. The invention has as a further object to provide a valve with a silent flow valve seat. The invention has as a further object to provide a valve with a removable and renewable silent flow valve seat. The invention has as a further object to provide a valve having associated with the valve seat a stationary silent flow device. The invention has further objects which are more particularly pointed out in the accompanying description.

Referring now to the drawing, Fig. 1 is a view of a flush valve with parts broken away, embodying the invention;

Fig. 2 is a fragmentary enlarged view showing the valve seat construction of the flush valve of Fig. 1;

Fig. 3 is a view showing a modified construction; and

Fig. 4 is a view showing the pressure receiving element and the noise eliminating element connected together.

Like numerals refer to like parts throughout the several figures.

Referring now to Figs. 1 to 4 inclusive, there is illustrated a flush valve having a casing 1 containing a main valve 2, which is illustrated as a piston valve. This valve has a seat engaging member 3 which engages a seat when the valve is closed to stop the flow, and a guide head 4 projecting beyond the seat engaging member 3 and which passes the seat in close proximity thereto when the valve is closed. This main valve may be of any suitable form and may be operated in any desired manner. I have illustrated a construction wherein the main valve has an auxiliary valve 2c with a stem 5, the auxiliary valve being actuated by the actuating member 6 moved by the handle 7. The casing is divided into two chambers 1a and 2a, the chamber 1a being connected with the inlet 1b through which the water from the source of supply passes. There is a bypass 1c which communicates at one end with the chamber 1a and at the other end 1d with the chamber 2a. There are passageways 2b leading from the chamber 2a to the chamber 3a in which the auxiliary valve is located. The by-pass is enlarged at 4a and there is a movable controlling member 5a therein which partially closes the by-pass, leaving a small opening through which the water passes from chamber 1a to chamber 2a. When the auxiliary valve 2c is open, water passes from the chamber 2a through the passageways 2b out through the auxiliary valve and the pressure of the water in chamber 1a on the piston 6a causes the piston to lift and open the main valve 2. After the flush the auxiliary valve closes and the water passes through the by-pass from chamber 1a to the chamber 2a, causing the main valve to close. When the handle 7 is moved, the auxiliary valve is operated and the main valve is lifted so as to open it and permit the liquid to flow from the source of supply into the discharge 8.

The valve seat is formed of two elements. One of these elements is a foraminous element and the other a pressure receiving element. The foraminous element may be made of screen material, wire gauze, or any suitable perforate material having a plurality of openings through which the liquid may pass. This element is preferably of Monel mesh screen, although it may be of any suitable material. The pressure receiving element 9 may be of any suitable form and material. When used in a flush valve it is preferably made of non-metallic material, and may be molded into the desired shape and size, and may have embedded in it metallic material 10.

The foraminous element preferably extends along the inner edge of the pressure receiving element and forms the wall of the passage through which the liquid passes when the valve is open. The upper portion of the foraminous element is preferably below the seating face 11 of the pressure receiving element, as clearly shown for example in Figs. 1 and 2. The foraminous element and the pressure receiving element may be held in position in any desired manner. In Figs. 1 and 2 there is illustrated a cheap, simple and effective manner of holding them in position. In this construction there is a recess 12 in the casing extending around the upper end of the discharge and the foraminous element is provided with a laterally extending member 13 which engages the bottom of this recess and an upstanding member 14 which forms the upper face of the discharge at its upper end. The pressure receiving element 9 is located in the space between the upstanding member 14 and the laterally extending member 13 of the foraminous element, as clearly shown in Figs. 1 and 2.

In the flush valve having the ordinary seat, noise occurs near the end of the flush at the time the flush valve is closing. This device eliminates this noise. When the main valve 2 is moved toward its closed position, the guide head 4 moves along the inner face of the upstanding portion 14 of the foraminous element, thus restricting the flow of liquid into the discharge and the main valve 2 when the valve is fully closed, rests upon the pressure receiving element 9. As the main valve moves to its closed position, the liquid passes through the foraminous element and is thus divided up into small sections and the noise due to the flow of the liquid is prevented so that the valve closes silently. The distance between the outer face of the guide head 4 and the inner face of the upstanding member 14 may of course be varied and arranged as desired. It is preferable to have this distance comparatively small to secure the best results. The clearance between these parts is preferably just sufficient to permit the free movement of the valve and by means of this construction the closing of the valve occurs without the usual noise. This foraminous or noise eliminating element may be easily removed and replaced by removing the pressure receiving element 9. It may be desirable to remove this noise eliminating element to clean it, to repair it or to renew it. As shown in Fig. 3, the pressure receiving element is preferably of metal and consists of a ring 16 threaded on its exterior face and engaging threads 17 on the face of the recess in the casing 18 of the valve. Any other suitable means of assembling the parts may be used. There is preferably some easy means for unscrewing the pressure receiving element 16, as by providing it with one or more recesses 19 for a tool.

In the manufacture of the device I prefer to have the noise eliminating element and the pressure receiving element connected together so as to form a unit, so that they can be handled together and shipped as a unit, and placed in position and removed as a unit. This construction is shown in Fig. 4. The connection of the two parts may be made in any desired manner, a simple manner being to make the upstanding portion 14 of such size with relation to the opening in the pressure receiving element that when they are assembled by pressure they will be connected so that they may be handled as a unit. When the pressure receiving element is of non-metallic material, such as rubber, the elasticity of the rubber may be utilized to hold the parts together.

I have described in detail a particular construction embodying my invention, but it is of course evident that the parts may be varied in many particulars without departing from the spirit of the invention as embdied in the claims hereto appended, and I therefore do not limit myself to the particular construction shown.

I claim:

1. A valve having a discharge passageway, a movable valve element for controlling said passageway, a stationary seat for said valve at the entrance of said passageway, comprising a pressure receiving element having an opening therein larger than the passageway and which receives the pressure of the valve when closed, and a noise eliminating element projecting radially inwardly beyond the inner face of the pressure receiving element to define a central opening therethrough of substantially the same size as said passageway.

2. A valve having a discharge passageway, a movable valve element for controlling said passageway, a stationary seat at the entrance of said passageway, comprising a pressure receiving element which receives the pressure of the valve when closed and a noise eliminating element projecting inwardly beyond the inner face of the pressure receiving element to define a central opening of a size on the order of that of the passageway and smaller than that through the pressure receiving element, the pressure receiving element acting to hold the noise eliminating element against removal.

3. A valve having a discharge passageway, a movable valve element for controlling said passageway, a seat at the entrance of said passageway, comprising a pressure receiving element which receives the pressure of the valve when closed and a noise eliminating element projecting inwardly beyond the inner face of the pressure receiving element, said valve element having a projecting portion which projects beyond the seating portion of the valve element and which extends along the pressure receiving element and the noise eliminating element when the valve is closed, said projecting portion being of such length that it comes into throttling relation with the noise eliminating element during the closing of the valve before the seating portion of the valve comes into throttling relation with said pressure receiving element.

4. A valve having a discharge passageway, a movable valve element for controlling said passageway, a seat at the entrance of said passageway, comprising a noise eliminating element having a laterally extending portion and an upstanding portion, and a pressure receiving element located at one side of the laterally extending portion and opposed to the upstanding portion of the noise eliminating element.

5. A valve having a discharge passageway, a movable valve element for controlling said passageway, the entrance to said passageway being provided with a recess extending entirely therearound, a stationary upstanding foraminous element in said recess extending therearound and having an opening to receive said valve element.

6. A valve having a discharge passageway, a movable valve element for controlling said passageway, the entrance to said passageway being provided with a recess, a stationary foraminous element in said recess and having a portion which extends entirely around said passageway and having a free opening therethrough approximately the size of the passageway and in alignment therewith, and a pressure receiving element surrounding and overlapping said portion of said foraminous element in telescoping relationship.

7. A valve seat comprising an annular foraminous element and a pressure receiving element, the foraminous element having an upstanding annular portion and a laterally extending annular portion, the pressure receiving element encircling the upstanding annular portion.

8. A valve seat comprising an annular foraminous element and a pressure receiving element, the foraminous element having an upstanding annular portion and a laterally extending annular portion, the pressure receiving element encircling the upstanding annular portion, said pressure receiving element and foraminous element having vertically extending overlapping portions.

9. In a valve having a core reciprocable within a housing containing a port or passage of smaller diameter than the housing, there being an annular groove formed at the entrance of said passage and opening into said housing, an annular silent-throttling element positioned in said groove and having its inner surface in substantial alignment with the inner surface of said port, said core having a forward portion for entry into the silent-throttling element and the port when the valve is moved toward closed position, there being an enlarged annular seating portion on said core, and an annular seating member positioned in said groove adjacent the silent throttling element for engagement by the enlarged seating portion of the core after the forward portion of the core has come into throttling position with respect to said silent-throttling element, said annular seating element being of substantially larger internal diameter than the inner wall of said silent throttling element so as to avoid a throttling action between the seating element and the forward end of the core, thereby confining the throttling action to the core and the silent-throttling element until the valve is about to seat.

10. In a valve arranged for silent throttling prior to closing, a reciprocable throttling member, and a silent-throttling ring element provided with a shoulder around its mouth, with respect to which shoulder said throttling member comes into throttling relation during closing of the valve as it is about to enter the silent-throttling element, a valve-closing annular shoulder disposed around said throttling member and longitudinally displaced therefrom so as to close the valve subsequent to the entry of the throttling member into said silent-throttling element, said valve having an annular seating portion extending around said silent-throttling element, said seating portion having an inside diameter sufficiently great that the throttling of the valve prior to final closing is permitted to occur between the throttling member and the shoulder of said silent-throttling element, and having its seating surface raised sufficiently above the said shoulder of the silent-throttling element that the pressure of seating is all carried by the said seating surface and none of it by the last said shoulder.

11. In a combination for use in a valve structure wherein a movable valve element seats around a passageway and has a throttling projection which moves into the passageway as the valve element is moved toward its seat, comprising a movable valve element, a throttling projection thereon, an annular valve seat and an annular silent throttling member, said throttling member and throttling projection being of such relative sizes that they telescope together to enable a combined installation to be made and being adapted to be installed in the valve structure so that the silent throttling element defines the entrance to said passageway and receives the said throttling projection as the valve element is moved towards its seat.

12. In a combination for use in a valve structure wherein a reciprocable valve element seats around a passageway and has a guiding projection extending into the passageway to act as a guide, comprising a reciprocable valve element, a passageway having a seat therearound upon which the valve element seats, said valve element having a projection which extends into the passageway to act as a guide, and an annular silent throttling member of semi-rigid construction, said valve seat forming an encircling member for the silent throttling member, said members being adapted to be positioned at the entrance of the passageway and in alignment therewith, enabling the guiding projection to operate therethrough.

CARL H. KRAUSE.